H. H. MOMYER.
MOVING PICTURE PROJECTOR.
APPLICATION FILED OCT. 27, 1915.
1,317,450.
Patented Sept. 30, 1919.
2 SHEETS—SHEET 1.
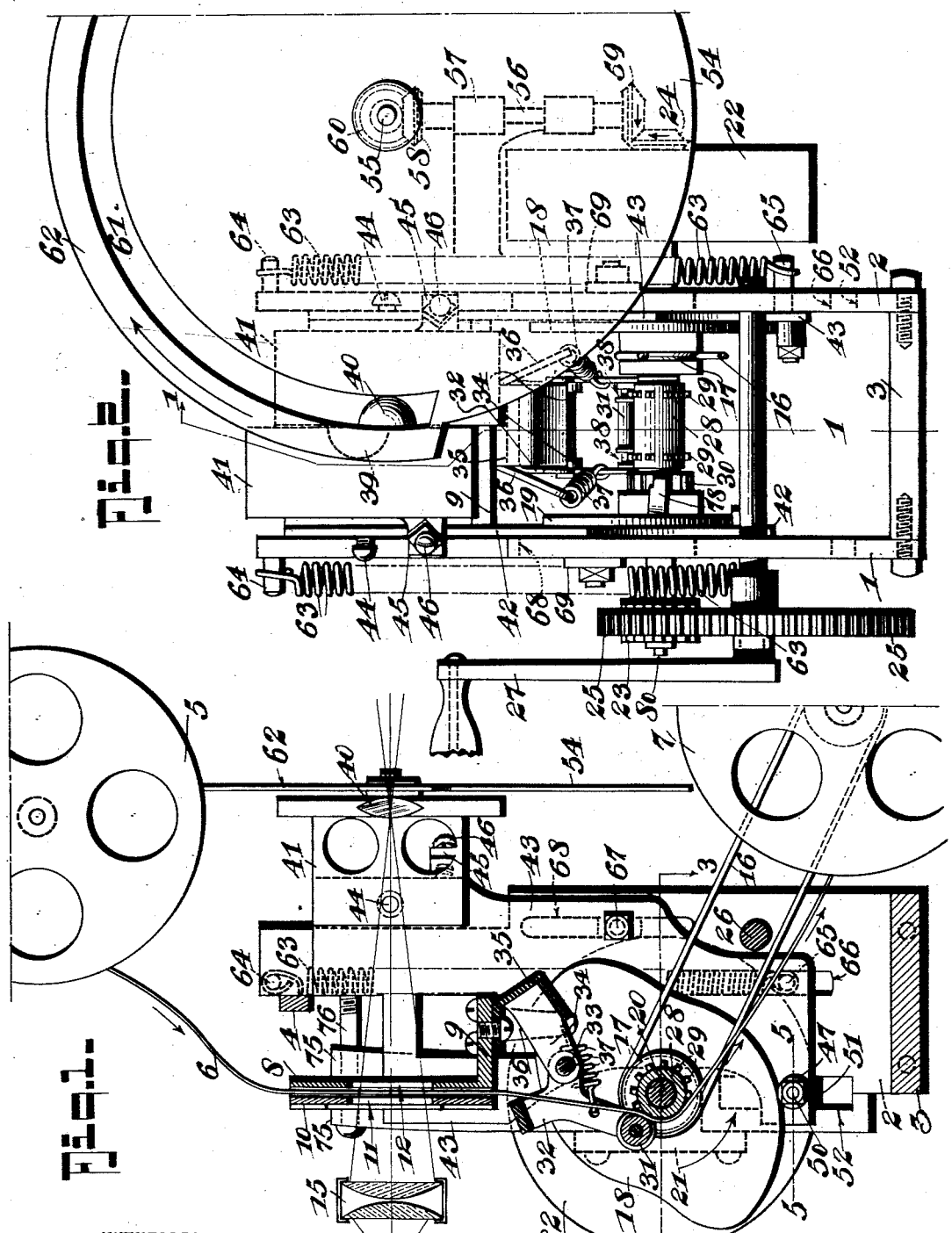
WITNESSES:
John G. Schrott
H. E. Beck
INVENTOR
Harry H. Momyer
BY Munn & Co.
ATTORNEYS

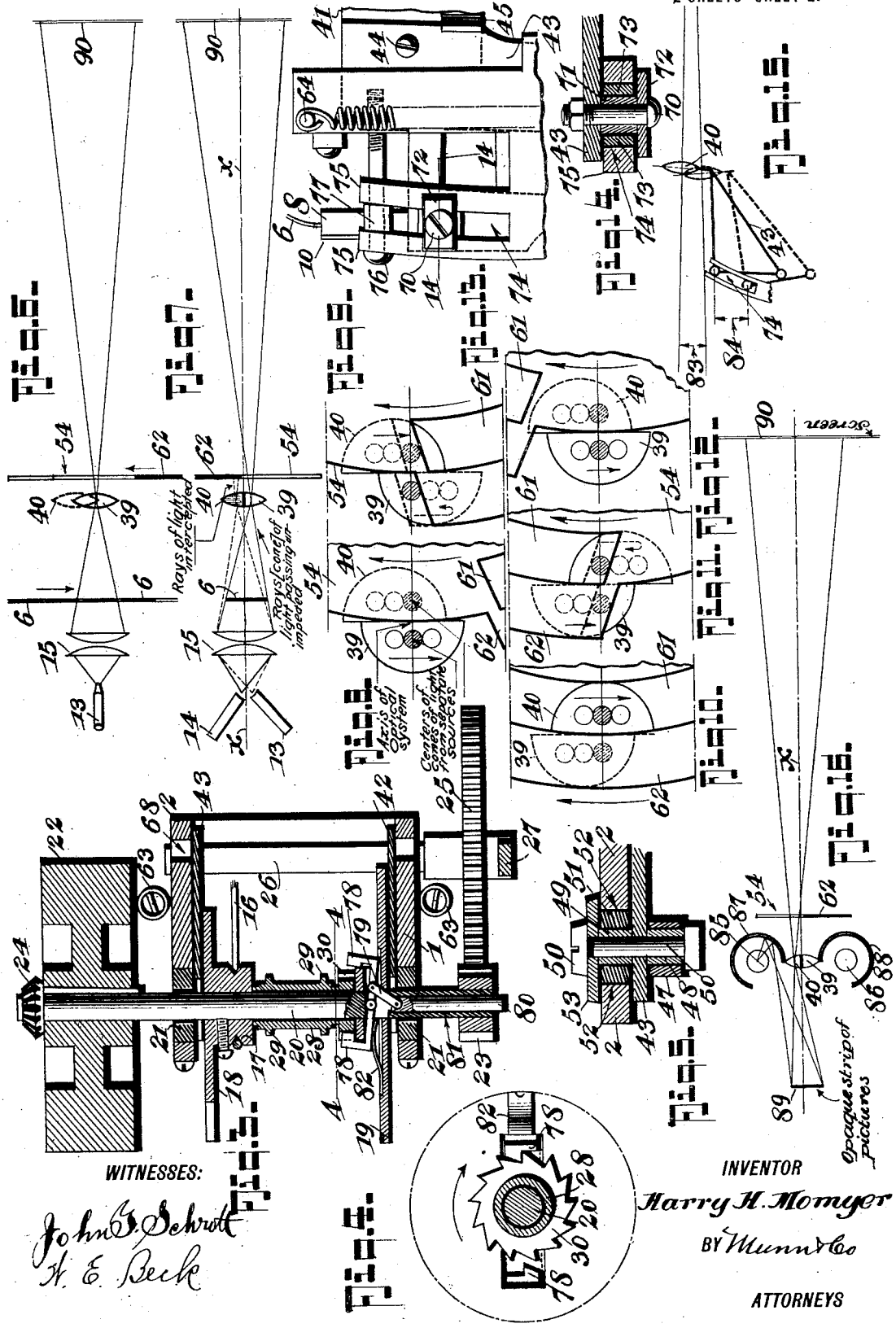

UNITED STATES PATENT OFFICE.

HARRY H. MOMYER, OF DODGE CITY, KANSAS.

MOVING-PICTURE PROJECTOR.

1,317,450.        Specification of Letters Patent.      Patented Sept. 30, 1919.

Application filed October 27, 1915. Serial No. 58,139.

*To all whom it may concern:*

Be it known that I, HARRY H. MOMYER, a citizen of the United States, and a resident of Dodge City, in the State of Kansas, have invented a new and useful Improvement in Moving-Picture Projectors, of which the following is a specification.

This invention is an improvement in an apparatus for projecting moving pictures and consists in certain novel constructions, combinations and arrangements of parts that will hereinafter be described and claimed.

The principal object of the invention is to provide a device in which there is a two-part lens, one half of which is adapted to be covered while the other half which performs the function of a whole lens being uncovered, is adapted to travel with the continuously moving film and at the same speed during such an interval of time in which one picture may be projected onto the screen. At the end of this time interval, the thin covered lens is uncovered and the next image on the film is exposed and projected onto the screen the effect being to dissolve one picture into the other and thus eliminate flickering of the picture.

Another object of the invention is to provide a motion picture projector having a source of light including horizontally disposed alternating current arc light carbons each having a crater, the two craters constituting two light spots which in effect are the apices of cones of light, the light spots being focused on the optical centers of a pair of half lenses.

Another object consists in the provision of a cam drive for each lens so that the lens exposed to the rays of light is made to travel at the same speed as the film is traveling, the same cam being cut in such manner as to permit the lens to return to its starting place when the lens becomes covered and the opposite lens is uncovered.

Another object lies in the provision of a guide which causes the exposed lens to move a proportional distance with the film so as to keep the lens at right angles with the rays of light and to keep the projected image centered on the screen.

Other objects of the invention will appear in the following description the mechanism being illustrated in the accompanying drawings, in which—

Figure 1 is a vertical section through the device.

Fig. 2 is a front elevation thereof.

Fig. 3 is a cross section on line 3—3 of Fig. 1.

Fig. 4 is a section on line 4—4 on Fig. 3.

Fig. 5 is a section on line 5—5 on Fig. 1.

Figs. 6 and 7 are diagrammatic views hereinafter described.

Figs. 8, 9, 10, 11 and 12 are diagrammatic views hereinafter described.

Fig. 13 is a detail view of the upper lens guide.

Fig. 14 is a section on line 14—14 on Fig. 13.

Fig. 15 is a diagrammatic view hereinafter described.

Fig. 16 is a diagrammatic view of a modification.

In the drawings, the supporting frame of the device consists of two side plates 1 and 2 which are spaced apart by a bottom plate 3 and a spacer or brace 4 at the top, the distance that the plates 1 and 2 are spaced apart being sufficient for the assembling of the working mechanism of the device, within them.

Mounted on a suitable support above the frame, is a film reel 5 from which the film strip 6 is unwound onto a take-up reel 7 which is mounted on a suitable support near the bottom of the frame as shown in Fig. 1. The film 6 passes through a straight film guide 8 which is secured to the frame side plates 1 and 2 by a foot 9 which extends laterally and is bolted into place as shown. A door 10 is hinged at one side of the guide 8, which when opened admits of placing the film in position, light openings 11 and 12 being provided in the door and the film guide through which the light passes from the carbons 13 and 14 to project the image from the film 6 onto the screen 90 (see Figs. 6 and 7). A condenser lens 15 concentrates the rays of light from the carbons 13 and 14 through the film on the projection lens, hereinafter to be described, the condenser 15 being located between the source of light and the film as shown in Figs. 1, 6 and 7.

The take-up reel 7 is driven by a belt 16 which receives its motion from a grooved pulley 17 which is formed on the hub of a cam 18 this cam being similar in shape to another cam 19 on the opposite side of the machine as shown in Fig. 2. The cams 18 and 19 are secured to and are in consequence rotated by a driven shaft 20 which is mounted in suitable bearings 21 in the side plates 1 and 2 as shown in Fig. 4.

The shaft 20 extends laterally beyond the frame a fly-wheel 22 being mounted on one end and a pinion 23 on the other a bevel pinion 24 being fixed on the shaft 20 adjacent the fly-wheel. A drive-gear 25 which is mounted on a shaft 26, meshes with the pinion 23 which is rotated when the operating handle 27 on the shaft 26, is turned the shaft 26 being suitably mounted in bearings on the side plates 1 and 2.

The film 6 in passing from the guide 8 to the take-up reel 7, passes over a double sprocket wheel 28 which has sprocket teeth 29 at each end the purpose of the teeth 29 being to engage the sprocket holes on each side of the commercial picture film and pull it through the guide after which it is wound on the reel 7.

The sprocket 28 is loosely mounted on the shaft 20 but is caused to travel with the shaft at the same speed, by a pawl and ratchet device the ratchet 30 being an integral part of the sprocket as shown in Fig. 3.

The film 6 is held into engagement with the sprocket by a roller 31 which is mounted on a cross shaft in the lower arms of a frame 32 these arms being connected by a bridge at the top as shown in Fig. 1. The arms 32 have forwardly extending ears which are pivotally mounted on a rod 33 the rod being held in the depending arms 34 of the frame support 35. The support 35 is secured beneath the lateral portion 9 of the guide 8 and has diagonally extending arms 36 on each side which are apertured to receive one end of a coiled spring 37. The spring 37 is also joined with the adjacent arm 32 of the roller frame and serves to hold the roller 31 against the film 6 so that there will be no likelihood of the film becoming disengaged from the sprocket. The roller 31 has grooves 38 at each end (see Fig. 2) which correspond in depth to the height of the teeth 29 of the sprocket, enabling the roller to readily move with the film.

The pictures on the film 6 are projected onto a screen 90 (see Figs. 6 and 7) through a projection lens which is divided on its vertical center so that the halves of the lens may be reciprocated vertically independently of each other. One of the halves is indicated by 39, the other by 40 each of the half lens being suitably mounted in a lens holder 41 each being of like construction.

Each lens holder 41 is mounted on a lens carrier plate 42 and 43 by a screw 44 which forms a means of securing the holder to the carrier plate and also as a fulcrum when it becomes necessary to adjust the lenses. Each lens holder has a diagonally projecting ear 45 near its lower edge in which an adjusting screw 46 is threaded the ends of the screw 46 having bearing against the edge of that lens carrier plate which it adjoins.

When either lens holder 41 is to be shifted to aline the focal plane of that lens 39 or 40 to a true right angular relationship with the axis of the optical system, then the screw 46 is adjusted against the edge of the carrier plate to which adjustment the screw is held by a lock nut.

The film 6 travels past the light openings 11 and 12 (see Fig. 1) at a uniform and relatively low speed, the speed being such that approximately but four separate images on the film pass the light openings in the duration of one second of time in contradistinction to the rapidly and intermittently moving film in machines of the types now known in which sixteen pictures are moved past the light opening in the same interval of time. The latter types of machines embody a fixed lens and the film moves ahead one picture at a time, the shutter cutting off the light from the screen while the change takes place and since this occurs sixteen times per second, as above stated, an annoying "flicker" is caused which I avoid with my device.

In my machine each of the half lens 39 and 40 travels with the film at the same speed as the film for three-fourths of the time interval taken for the projection of one picture the remaining quarter of the same time interval being consumed in returning the lens to its original position and dissolving the one picture into the next.

Thus it will be seen that the film has a constant motion and each lens returns to position and projects alternate pictures.

The lens 39 and 40 are moved up and down by the cams 18 and 19 and by referring to Fig. 1 it will be seen that the cam 18 which is similar to 19 is a double one having two opposite high places as well as low places. The cam 18 engages a roller 47 which is mounted on a collar 48 which with a similar collar 49 is mounted on a bolt 50 (see Fig. 5) the collars 48 and 49 serving as clamping members and spacers for the roller 47 and a sliding block 51 which moves in a slot 52 in the side plates 1 or 2. The collars 48 and 49 are clamped against the faces of the lens carrier 43 as shown in Fig. 5, a washer 53 being placed under the head of the bolt 50 to prevent the block 51 from slipping from the slot 52.

As the cam rotates in the direction of the arrow in Fig. 1 lens carrier 43 will be moved downwardly, the lens 40 being carried with it. In Fig. 1 the cam 18 has carried the lens 40 through one half of its downward travel the lens being now positioned on the optical axis as shown in Figs. 2 and 11, the picture on the film 6 being now projected through this lens 40 onto the screen. When the lens is centered on the optical axis as shown in Fig. 11 it will have traveled two-fourths of its stroke there being yet one-fourth of the stroke to be traveled before the picture now being projected, is dissolved into the next picture through the lens 39.

The pictures are dissolved one into the other by a circular shutter 54. This shutter is mounted on a shaft 55 which is supported in suitable bearings. The shutter is rotated in the direction of the arrow in Fig. 2 by a shaft 56 which is mounted in a bearing 57 and has bevel pinions 58 and 59 on its upper and lower ends respectively. The pinion 58 meshes with a similar pinion 60 on the shutter shaft 55 while on the pinion 59 meshes with the pinion 24 on the shaft 20 from which motion is derived.

The normal periphery of the shutter coincides with the division line of the half lenses as shown in Figs. 2 and 8, a slot 61 being formed in the shutter below the periphery, an enlargement 62 being formed above the periphery, the slot and enlargement extending approximately over one half of the circumference of the shutter. When the picture is being projected through the lens 40 and the slot 61, as explained above and when the lens, completes its travel and reaches the bottom of its stroke then at that moment the lens 40 is covered by the body of the shutter 54 and the lens 39 is uncovered by the enlargement 62 the next picture on the film being then thrown onto the screen. The dissolving of one picture into the other in the manner just described is rendered possible since each half of the lens is constantly projecting pictures but their position is so regulated that both pictures center on the screen, the dissolving shutter cutting the light from the lower picture on the film off, as the upper picture comes into position.

The rollers 47 of the lens carriers 42 and 43 are held against the cams 18 and 19 by springs 63 which are hooked over a stud 64 at the top of frame, and another stud 65 which projects from each one of the lens carriers 42 and 43 through slots 66 in the side plates.

The lens carriers are guided in a vertical movement by bolts 67 which are secured to each carrier and pass loosely through slots 68 in the side plates 1 and 2. A washer 69 is fitted on the bolt against the outer face of each side plate and the washer is held in place by a suitable nut as shown in Fig. 2. The lens carriers are further guided by a bolt 70 of which there is one for each carrier.

The bolt 70 passes through a collar 71, a washer 72 and the body of the lens carrier, the collar 71 being clamped between the washer 72 and the lens carrier when the nut on the bolt is tightened (see Fig. 14). A block 73 is mounted on the collar 71 and slides in the slot 74 formed by the semi-resilient arms 75 which may be a portion of the side plates 1 and 2. As before stated, each lens when exposed, travels downwardly at the same speed as the film this travel being caused by the action of the respective cams on the respective lens carrier. In order that the picture may not shift its position on the screen as the lens and film move, a curved guide has been provided for the lens which will keep the picture centered on the screen.

The curved guide consists of the two arms 75 which are apertured at the top for the passage of an adjusting screw 76 which is threaded into the body of the side plate. A collar 77 is fitted on the screw 76 between the arms 75 to preserve the space 74; as the screw 76 is turned inwardly the arms 75 are bent to the desirable degree which then forms the curved guide for the block 73 on the upper end of the lens carrier. Thus by passing the film 6 through a straight guide 8 causing the roller 47 against which the cam operates to move in a straight vertical plane and by curving the edge against which the upper end of the lens carrier is guided, sufficient swing is given the lens to keep it at a true right angular relationship between the moving film and the center of the lens. By tightening or loosening the screw 76 the arms 75 may be bent to give them more or less curvature which will effect a rocking motion on the lens to a greater or lesser degree as may be required. The shift of the lenses 39 and 40 is scarcely perceptible but is illustrated in Fig. 15 in which 83 designates the relatively small movement of the center of the lens in comparison with the greater movement 84 of the lens carrier.

The "framing" of the picture on the screen is accomplished through the use of the ratchet 30 on the sprocket 28 with which ratchet 30 a double pawl 78 coöperates. The pawl 78 is pivoted in a slotted portion of the shaft 20 a link 79 being connected to the pawl adjacent the pivot, the link being connected to a push rod 80 which slides in an opening 81 in the shaft 20 and extends beyond the shaft so as to be accessible by the operator. A leaf spring 82 presses the pawl 78 in one direction so that one of its teeth always engages the teeth of the ratchet 30 as shown in Fig. 3.

If the projected picture is not centered on the screen or in alinement with the then exposed lens, it may be properly centered or "framed" by pressing on the rod 80 which will allow the ratchet 30 to be moved backwardly or forwardly as desired.

Since an alternating current is used to form the arc between the separated carbons 13 and 14 the ends of the carbons remain substantially flat or form into shallow crater shapes at the ends. These craters virtually form two sources of light.

This same idea is substantially carried out by the use of separate sources of light 85 and 86 as shown in the modified form in Fig. 16. The light from the lamps 85 and 86 is reflected by curved reflectors 87 and 88 onto an opaque picture strip 89 from which the pictures are projected by the same shutter device as described and illustrated for the principal form. It will be seen that when the lens 39 is covered by the part 62 of the shutter, then only the rays of light reflected from the reflector 87 are projected onto the screen 90.

Having thus described the mechanism, the manner in which it operates is as follows:

The carbons 13 and 14 of the arc light are adjusted to a distance of about one-eighth of an inch apart the light being transmitted, through the condenser lens 15 and film 6, to the projection lenses 39 and 40. The carbon sticks are arranged horizontally as shown in Fig. 7 each carbon lying at either side of the horizontal center line $x$, the crater shaped ends of the opposing carbons constituting theoretically separate sources of light the rays of which are gathered by the condenser 15, and transmitted to that lens which happens to be uncovered by the dissolving shutter 54, at the time. The rays of light from each carbon converge at a point at the center of each lens as shown in Fig. 7, in which the rays or "cone" of light is shown as coming to a point at the lens 39.

After adjusting the carbons as described, the lens holders 41 are adjusted on their pivots 44 in such manner that the rays of light projected by both lenses will coincide on the screen, this adjustment being accomplished by the screws 46.

Let it be assumed that an image on the film 6 is just coming into proper registration with the light openings in the fixed guide 8 the dissolving shutter moving upwardly and just about to dissolve the new picture into the previous one on the film. At this time the light from the carbon 13 is passing through the lens 39 which has reached the limit of its three-fourths travel but is still projecting the picture on the screen.

Now when the next picture comes into view the enlargement 62 of the shutter will gradually cover up the lens 39 as the opening 61 uncovers the lens 40. This position of parts is clearly shown in Fig. 9 from which it will also be noticed that the act of covering the lens 39 simultaneously uncovers the lens 40 which is at the top of its stroke and beginning to move downwardly as indicated by the arrow. The darkened area on the lens 40 indicates where the new picture is being projected through the lens by the light from the carbon 14.

The lens 40 is now traveling downwardly at the same speed as the film 6 is traveling, the lens virtually "carrying" the picture from the film, with it. It should be understood that the picture remains centered on the screen 90 since the lens carrier 18 receives its downwardly curved movement by means of the guide 75 as previously explained.

The lens 39 does not immediately return, however as soon as the lens 40 is uncovered as shown in Fig. 9, and as previously described, but the lens 39 travels with the film until the dissolving of the one picture into the next, through the lens 40, is completed. The shutter at this time will have reached the dotted line position shown in Fig. 9 at which time the optical axis of the lens 39 will have been covered while that of the lens 40, uncovered; it is now that the lens 39 returns as indicated by the arrow. The lens 39 in turn moves from its upper position after the lens 40 completes the projection of the then registering picture in the manner explained.

As soon as the lens 40 has traveled three-fourths of its downward stroke, the change takes place as indicated in Fig. 11 from which it will be seen that the lens 39 is about to move and project the next picture from the film onto the screen and while the dissolving effect as previously described, takes place, the lens 40 returns to the normal position in readiness for the succeeding picture, as shown in Fig. 12.

From the foregoing description it will be recalled that the reciprocation of the lenses 39 and 40 is effected by the action of the cams 42 and 43 on the lens carriers 18 and 19.

The use of the separated carbons constituting two sources of light makes the device, virtually two machines which alternately project pictures from a single standard film, the substitution of the ratchet release device 30—78 forming an improved manner of "framing" the picture, over the common use of the tilting frame below the table.

I claim:—

1. In a motion picture projector, a vertically split lens providing a half lens on each side of the physical axis, each half lens being operated as a whole lens, and a source of light including alternating current electric light carbons disposed in a horizontal plane, the crater of each carbon being optically centered with the companion half lens on the opposite side of the physical axis.

2. In a motion picture projector, an optical system including a vertically split lens, providing two half lenses, each lens being operated as a whole lens, a condenser, and an alternating current electric light behind the condenser including horizontally disposed carbons having craters constituting in effect the apices of cones of light, said condenser, and each of the craters and half lenses on diagonally opposite sides of the physical center of the optical system being optically centralized.

3. In a motion picture projector, means for continuously moving a film, an alternating current electric light behind the film including horizontally disposed carbons having craters on each side of the physical axis, and constituting in effect the apices of cones of light, a half lens on each side of the physical axis and optically centered with the companion carbon, said half lenses projecting alternate pictures on the film, a shutter for covering the half lenses alternately and means for simultaneously imparting a downward stroke to one of the lenses to move it with the film, and shifting the focal plane of said lens while the other half lens is covered.

4. In a motion picture projector, a half part projection lens located at each side of a physical axis in front of a film arranged to pass through the projector, lens carriers for the half lenses, means for alternately moving the lens carriers in a vertical plane, and guide means coöperating with said carriers for shifting the focal plane of each lens with and in proportion to the movement of the film, including means for adjusting said guide means to vary the amount of shifting of the focal planes.

5. In a motion picture projector, a frame, a lens carrier, means for reciprocating the lens carrier, a lens mounted on the carrier, means carried by the frame for guiding the lens carrier, including resilient arms projecting from the frame, a sliding member mounted on the lens carrier and extending between the arms, and an adjusting screw threaded into the frame adapted to curve the arms and tilt the lens carrier to shift the focal plane of the lens as the lens carrier is reciprocated.

6. In a motion picture projector, the combination of a frame, lens carriers mounted on the frame, a lens holder having a lens, pivotally mounted on each carrier, an ear projected laterally from each holder, said ear having a threaded aperture, and an adjusting screw in the aperture in engagement with the adjacent edge of the lens carrier.

7. In a motion picture projector, a supporting frame having slots, a lens carrier at each side of the frame having slide blocks movable in said frame slots, rollers on the lens carriers, a drive shaft mounted in said frame, double cams mounted on each shaft and engaging the rollers on the lens carriers, and means for forcing contact of the rollers with the cams.

8. In a motion picture projector, the combination with a frame, of a shaft mounted on the frame and having an operating handle and gear, a driving shaft mounted on the frame and having a pinion in mesh with the gear, a fly wheel and a bevel pinion mounted on the opposite end of the drive shaft, a dissolving shutter having a bevel pinion, an intermediate shaft connection between the shutter and the drive shaft, a film take-up reel having a pulley, a pulley mounted on the drive shaft, and a connecting belt between the drive shaft and reel pulleys.

HARRY H. MOMYER.

Witnesses:
F. A. MOSES,
F. E. BROWN.